US012204939B1

(12) United States Patent
Brown et al.

(10) Patent No.: US 12,204,939 B1
(45) Date of Patent: Jan. 21, 2025

(54) MANAGING CLOUD PRICING AND WHAT-IF ANALYSIS TO MEET SERVICE LEVEL GOALS

(71) Applicant: Teradata US, Inc, San Diego, CA (US)

(72) Inventors: Douglas P. Brown, Rancho Santa Fe, CA (US); Stephen A. Brobst, Las Vegas, NV (US); Frank Roderic Vandervort, Ramona, CA (US); Louis Martin Burger, Escondido, CA (US)

(73) Assignee: Teradata US, Inc., San Diego, CA (US)

( * ) Notice: Subject to any disclaimer, the term of this patent is extended or adjusted under 35 U.S.C. 154(b) by 700 days.

(21) Appl. No.: 17/480,899

(22) Filed: Sep. 21, 2021

(51) Int. Cl.
*G06F 9/48* (2006.01)
*G06F 9/50* (2006.01)
*G06F 11/34* (2006.01)

(52) U.S. Cl.
CPC .......... *G06F 9/4887* (2013.01); *G06F 9/5044* (2013.01); *G06F 9/505* (2013.01); *G06F 11/3433* (2013.01); *G06F 11/3457* (2013.01)

(58) Field of Classification Search
None
See application file for complete search history.

(56) References Cited

U.S. PATENT DOCUMENTS

| | | | |
|---|---|---|---|
| 7,127,456 | B1 | 10/2006 | Brown |
| 8,042,119 | B2 | 10/2011 | Richards |
| 8,818,988 | B1 | 8/2014 | Brown |
| 9,875,146 | B1 | 1/2018 | Brown |
| 10,261,888 | B2 | 4/2019 | Brown |
| 2018/0157710 | A1* | 6/2018 | Guirguis ................. G06F 16/27 |

OTHER PUBLICATIONS

Fahad R. Dogar, et al., Decentralized Task-Aware Scheduling for Data Center Networks, Proceedings of SIGCOMM '14, 2014.
Zhe Huang, et al., Discovering Valuations and Enforcing Truthfulness in a Deadline-Aware Scheduler, Proceedings of IEEE Infocom, 2017.

(Continued)

*Primary Examiner* — Eric C Wai
(74) *Attorney, Agent, or Firm* — Howard Speight (57) ABSTRACT

A computer system executes a database management system (DBMS). The DBMS manages a database comprised of DBMS resources. The DBMS receives a request to be executed. The request is a DBMS action to be executed using the DBMS resources. The request includes a predicate specifying a maximum cost for executing the request, and a deadline, specifying a deadline by which the request is to be completed in its execution. The DBMS determines a plurality of workloads under which the request is qualified to execute. Each workload of the plurality of workloads includes a respective set of requests that have common characteristics. Each workload of the plurality of workloads includes a respective cost criterion and a respective elapsed time criterion. The DBMS selects a selected workload from among the plurality of workloads. The selected workload has a selected cost criterion and a selected elapsed time criterion. The DBMS begins execution of the request using the selected workload.

18 Claims, 4 Drawing Sheets

(56) References Cited

OTHER PUBLICATIONS

Xiaoqiao Meng, et al., Improving the Scalability of Data Center Networks with Traffic-aware Virtual Machine Placement, Proceedings of IEEE Infocom, 2017.

Jin Xu, et al., Multi-objective Virtual Machine Placement in Virtualized Data Center Environments, Proceedings of 2010 IEEE/ACM International Conference on Green Computing and Communications and 2010 IEEE/ACM International Conference on Cyber, Physical and Social Computing.

Orna Agmon Ben-Yehuda, et al., Deconstructing Amazon EC2 Spot Instance Pricing, , ACM Trans. on Economics and Computation, vol. 1, No. 3, 2013.

Liang Zheng, et al., How to Bid the Cloud, Proceedings of SIGCOMM '15, 2015.

Veena Khandelwal, Bidding Strategies for Amazon EC2 Spot Instances—A Comprehensive Review, Proceedings of 2018 Fourth International Conference on Computing Communication Control and Automation (ICCUBEA).

* cited by examiner

| Vantage Units | On Demand | Off Peak | Super Off Peak | Spot Pricing |
|---|---|---|---|---|
| 100 | 100% | 60% | 40% | 40% - 10% |
| 10,000 | 90% | 50% | 30% | 30% - 2% |
| 1,000,000 | 90% | 40% | 25% | 25% - 1% |
| 1,000,000,000 | 90% | 40% | 20% | 20% - 1% |

FIG. 7

MANAGING CLOUD PRICING AND WHAT-IF ANALYSIS TO MEET SERVICE LEVEL GOALS

BACKGROUND (Note: This application references a number of different publications as indicated throughout the specification by one or more reference numbers within brackets [x]. A list of these publications ordered according to these reference numbers can be found below in the section entitled "References." The Reference section also lists some publications that are not explicitly referenced in this application. Each of these publications, including those that are not explicitly referenced, is incorporated by reference herein.)

As businesses increasingly utilize cloud infrastructure to run their applications, cloud providers (CPs) have begun to offer a variety of cloud-based services [12, 13, 14, 15]. Infrastructure-As-A-Service (IaaS), as its name suggests, provides users with time on virtualized compute resources that are hosted on the CP's physical servers. Since users can freely choose the amount of compute resources that they rent from the CP, IaaS can provide them with on-demand resource elasticity, i.e., virtualization of computing resources that can expand or contract to meet real-time user demands. For instance, a business running data analytics on its webpage browsing patterns might decide to rent more compute resources at times when many users are accessing its website.

Cloud database vendors are increasingly offering pay-as-you-go pricing models as part of their As-A-Service (aaS) offerings. Most cloud vendors categorize their pricing model into three different categories:

On-Demand Instances: Let the purchaser pay for compute capacity by the hour with no long-term commitments or upfront payments, allowing the purchaser to increase or decrease compute capacity depending on the demands of the purchaser's application and only pay the specified hourly rate for the instances used.

Reserved Instances (RIs): Provide the purchaser with the ability to invest in a larger upfront payment to receive a greater discount. RIs can minimize risks, more predictably manage budgets, and comply with policies that require longer-term commitments. A purchaser's RIs will typically be available for the operating system and Availability Zone (i.e., geographical region, such as eastern United States) in which it was purchased.

Spot Instances: With Spot Instances, the purchaser can bid for unused capacity in a CP's data center and save up to 90% of the cost when compared to On-Demand Instances. However, if another bidder bids higher, the instance will be taken away. The usage of Spot Instances can play a key role in reducing cloud costs. Amazon Web Services ("AWS"), Google, and Azure all provide the option to use Spot Instances. For example, Spot Instances are very useful in both batch processing and high-performance clusters, as well as Enterprise Data Warehouse (EDW) servers with variable workloads. Because Spot Instances are tightly integrated with services such as Auto Scaling, Elastic MapReduce (EMR), Elastic Container Service (ECS), CloudFormation, Data Pipeline and AWS Batch, the purchaser can choose how to launch and maintain applications running on Spot Instances.

Moreover, a purchaser can easily combine Spot Instances with On-Demand, RIs, and Savings Plans Instances to further optimize workload cost with performance. Due to the operating scale of AWS, Google and Azure, Spot Instances can offer the scale and cost savings to run hyper-scale workloads, also providing the option to hibernate, stop or terminate Spot Instances when the IaaS reclaims the capacity back with two-minutes of notice.

CPs today offer a variety of different IaaS pricing policies that can incentivize different types of user behavior. For example, volume-discounted pricing charges users at a reduced unit price per instance if their usage exceeds a given threshold; such a pricing policy incentivizes users to submit larger, longer-lived jobs that can take advantage of the volume discount. Examples of such pricing include Google Cloud Platform's sustained-use discount [12] and Amazon EC2's reserved instances [13]. However, while CPs can help to stabilize their resource demands with volume discounts, they cannot entirely avoid fluctuations in users' resource needs. Since datacenters typically have a fixed physical capacity at an hour-to-hour or day-to-day timescale, the CP typically provision their infrastructure to users' peak demands, leaving some idle resources at off-peak times.

To improve off-peak utilization, CPs can offer their users reduced prices at these times, e.g., Google's preemptible virtual machines' [19] and Amazon EC2 spot instances' auction-based spot pricing [14]. Since it would be difficult for the CP to predict its idle resources at any given time, neither of these schemes guarantees their users access to cloud resources; instead, they promise to provide resources to users if those resources are available in the future. Users then accept a lower price in exchange for unpredictable resource availability. Spot instance auctions, in particular, allow users to optimize their bids so as to reduce the amount of job interruptions due to resources being unavailable.

These new pricing models may be used to meet service level goals ("SLGs") of a database in the cloud or hybrid-cloud (i.e., a combination of local and cloud-based resources) and can be measured in a price-controlled database cloud environment using pricing estimations and Workload Management techniques as described in [4, 5, 6, 7]. As a result, billing models can be provided for databases, such as those provided by Teradata Corporation, including, for example, "Pay on Demand," "Pay as You Go," "Spot Pricing," or "Discounted Vantage Consumption" models [1], for example, on a per query and/or Workload Definition (WD) basis.

Estimating runtime and pricing metrics for SQL queries may be used for query execution efficiency, resource allocation, priority scheduling, and workload management, especially but not exclusively, in a cloud environment, which can be very dynamic and have financial costs associated with it. In other words, Workload Management needs good runtime and pricing estimates to make decisions about query priority, workload classification, workload exceptions, workload scheduling, and capacity planning i.e., Capacity on Demand (COD) in the cloud or on-prem (i.e., local or "on premises") or in a hybrid-cloud environment.

While existing systems may have hard-coded formulas for estimating run-times for queries and functions, they may fall short in estimating accurate capacity, configuration and query price estimation in real-time. Cloud IaaS pricing and costs further complicate the estimation problem. Herein, methodologies for capturing price-related properties and formulas augmented with self-tuning and adaptive capabilities are described. The proposed solution equally applies to new workload management capabilities. Moreover, it combines the advantages of self-correction, and autonomous tuning capabilities. The techniques described herein are applicable to all database and data analytics systems, including those provided by Teradata Corporation.

To summarize, the need for good runtime and pricing estimation metrics is even higher on the cloud for several reasons:
1. The runtime infrastructure on the cloud is abstracted from the processing layer and varies between different CPs and different deployment options within the CP.
2. Elasticity of the processing layer often requires the allocation of different levels of resources for different workloads, queries, or query steps/functions. A good estimate of the resource cost is helpful for efficient allocation of resources.
3. Cloud solutions are more cost sensitive at the operation level due to the accumulated cost of software and infrastructure services with a more incremental pay model. A good runtime cost estimate is, therefore, helpful to optimize the financial cost of operations on the system.
4. Good run-time and price estimations are useful for both cloud and on-prem data analytics solutions:

The problems addressed by the techniques described herein include:
1. Financial Budget forecasting—For example, the Chief Information Officer ("CIO") of a company wants to reduce costs associated with Cloud infrastructure and requests a financial report, to be provided every Monday morning, in which such costs are broken down by User, Account, Application, Cloud Instance to know what weekly charges will be incurred in local currency i.e., US dollars, Euros, Bitcoin, etc., In this way, the CIO can place budget constraints on Users, Applications and Accounts on a weekly basis, etc.
2 "What-if" pricing in different scenarios for execution— For example, given that the database provider executes a user's query/job by a certain deadline, the user doesn't care when you run the query provided that it must be run at the cheapest price possible. For example, get this job done by Friday at 5:00 pm at the cheapest possible price. Note, in this example there are no rewards for finishing early. It would be helpful in this scenario for the user to see different pricing options run under varying conditions, i.e., "what-if" pricing.
3. Optimal system load balancing—Optimal system load balancing is defined as the optimization of incoming work to keep the system at a consistent level of busyness, thereby smoothing out the peaks and valleys of system resources. For example, work may be shifted from peak to off-peak or super off-peak times to keep a steady stream of work on the system at all times. It may be desirable to keep the system at 60-80% at all times to even out the peaks and valleys so the system doesn't need to expand capacity to meet SLGs in peaks times, perhaps costing an in-premises provider or a hybrid cloud provider more to rent more capacity from the cloud provider, and to make sure that such providers are not missing out on any revenue associated with such consumption (known in the Teradata systems as "Vantage Units (VUs)"). As such, the pay per use revenue model maintains a healthy profit margin (note: generally, profit margin may take a hit when the system(s) are under-utilized for extended periods of time). This more flat and constant system resource demand and utilization is achieved by using methods of management to throttle and schedule non-critical work to run during non-peak times. In this way, users can be incentivized to submit work that can be scheduled offering a discount for requests scheduled to run in off-peak times or a 20 percent or more in super off-peak times.

SUMMARY

In one aspect, a computer-implemented method includes executing a database management system (DBMS) in a computer system. The DBMS manages a database comprised of DBMS resources. The DBMS receives a request to be executed. The request is a DBMS action to be executed using the DBMS resources. The request includes a predicate specifying a maximum cost for executing the request, and a deadline, specifying a deadline by which the request is to be completed in its execution. The DBMS determines a plurality of workloads under which the request is qualified to execute. Each workload of the plurality of workloads includes a respective set of requests that have common characteristics. Each workload of the plurality of workloads includes a respective cost criterion and a respective elapsed time criterion. The DBMS selects a selected workload from among the plurality of workloads. The selected workload has a selected cost criterion and a selected elapsed time criterion. The DBMS begins execution of the request using the selected workload.

Implementations may include one or more of the following. The computer system may include multiple computer systems, including a cloud-based computer system. The costs may be expressed as a measurement of system resources, such as processors, memory, input/output (I/O), network bandwidth, etc., consumed by an individual request. The DBMS selecting the selected workload may include the DBMS providing the cost criterion and elapsed time criterion for each of the plurality of workloads to a user and the user selecting the selected workload from among the plurality of workloads. The DBMS selecting the selected workload may include the DBMS applying selection rules to the plurality of workloads. The DBMS may track accumulated costs of execution of the request and determine that the accumulated costs will exceed the maximum cost included in the request predicate or may determine that execution of the request will not satisfy the deadline included in the request predicate and the DBMS declares an exception. The DBMS may, in managing workloads, monitor system conditions and operating environment events that impact on the operation of the computer system. Each of the system conditions may represents a condition of the computer system and each of the operating environment events may represent a workload performed by the computer system. The DBMS may use an n-dimensional state matrix to identify at least one state resulting from the monitored system conditions and operating environment events. Each element of the state matrix may be a system condition and operating environment event pair that references a workload management state. The DBMS may initiate an action in response to the identified state. The action may invoke one or more workload management rules of a set of workload management rules that define how the computer system operates on the workloads. The DBMS may change the state in the n-dimensional state matrix when the selected workload exceeds the selected cost criterion. The DBMS, prior to determining the plurality of workloads under which the request is qualified to execute, may run a simulation of the computer system on a test system. The computer system may have a current configuration. The test system may determine a cost of running the request assuming the request is run on the computer system with a configuration different from the current configuration. The DBMS, prior to determining the plurality of workloads under which the request is qualified to execute, may runs a simulation of the computer system on a test system. The test system may determine a cost of running the request under a plurality of workloads.

In one aspect, a non-transitory computer-readable tangible medium includes a recording of a computer program. The computer program includes executable instructions, that, when executed, perform a method including executing a database management system (DBMS) in a computer system, wherein the DBMS manages a database comprised of DBMS resources. The DBMS receives a request to be executed, wherein the request is a DBMS action to be executed using the DBMS resources. The request includes a predicate specifying a maximum cost for executing the request, and a deadline, specifying a deadline by which the request is to be completed in its execution. The DBMS determines a plurality of workloads under which the request is qualified to execute. Each workload of the plurality of workloads includes a respective set of requests that have common characteristics. Each workload of the plurality of workloads includes a respective cost criterion and a respective elapsed time criterion. The DBMS selects a selected workload from among the plurality of workloads. The selected workload has a selected cost criterion and a selected elapsed time criterion. The DBMS begins execution of the request using the selected workload.

In one aspect, an apparatus includes a computer system executing a database management system (DBMS). The DBMS manages a database comprised of DBMS resources. The DBMS receives a request to be executed. The request is a DBMS action to be executed using the DBMS resources. The request includes a predicate specifying a maximum cost for executing the request, and a deadline, specifying a deadline by which the request is to be completed in its execution. The DBMS determines a plurality of workloads under which the request is qualified to execute. Each workload of the plurality of workloads comprises a respective set of requests that have common characteristics. Each workload of the plurality of workloads includes a respective cost criterion and a respective elapsed time criterion. The DBMS selects a selected workload from among the plurality of workloads. The selected workload has a selected cost criterion and a selected elapsed time criterion. The DBMS begins execution of the request using the selected workload.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Example Computer System

Figure 1:
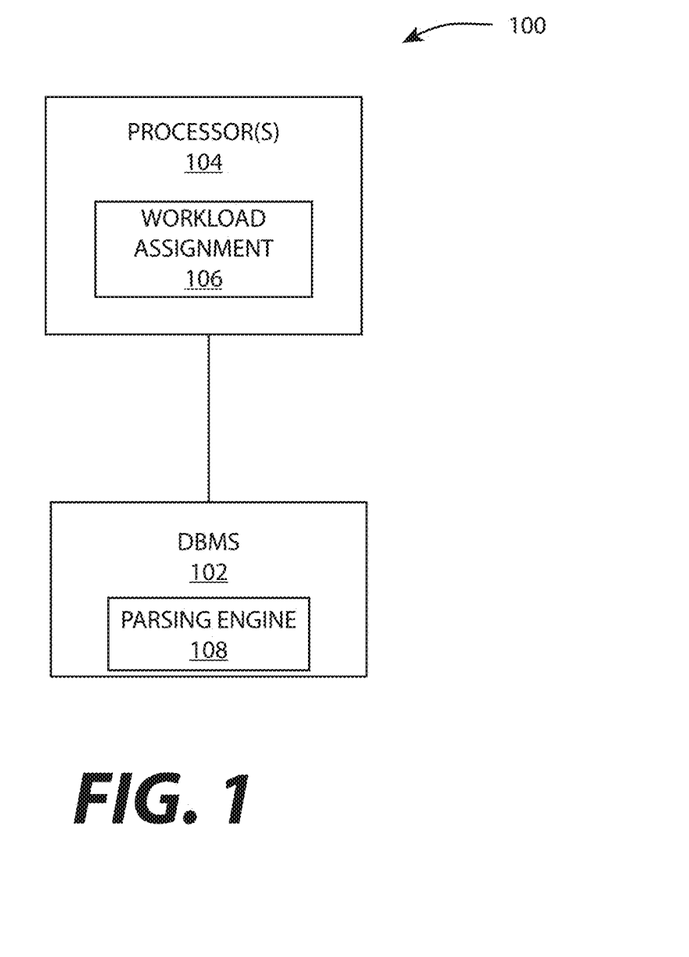
FIG. 1 is one example of a block diagram of a computer system.

The techniques disclosed herein have particular application to, but are not limited to, systems such as the system 100 illustrated in FIG. 1. The system 100 includes a includes a variety of hardware components and software components that may be deployed on an appliance, on commodity hardware, in a private cloud, in a public cloud, or in a combination thereof. The software components are programmed as executable instructions into memory and/or a non-transitory computer-readable medium for execution on the hardware components (including, for example, hardware processors). The system 100 includes one or more network connections; the networks can be wired, wireless, or a combination of wired and wireless.

The system 100 implements, among other things, the processing described below in connection with FIGS. 1-7.

An Example Database Management System

The system 100 includes a Database Management System (DBMS) 102, at least one hardware processor 104, and a non-transitory computer-readable storage medium having executable instructions representing a workload assignment technique 106 as disclosed herein. The DBMS may be a relational DBMS (RDBMS) or it may be another variety of database management system.

The DBMS 102 may include a parsing engine 108, discussed below in connection with FIGS. 2 and 3, that organizes the storage of data and the distribution of database table rows and coordinates the retrieval of data from the data-storage facilities in response to queries received from a user. The DBMS 100 usually receives queries and commands to build tables in a standard format, such as Structured Query Language (SQL).

Figures 2, 3:
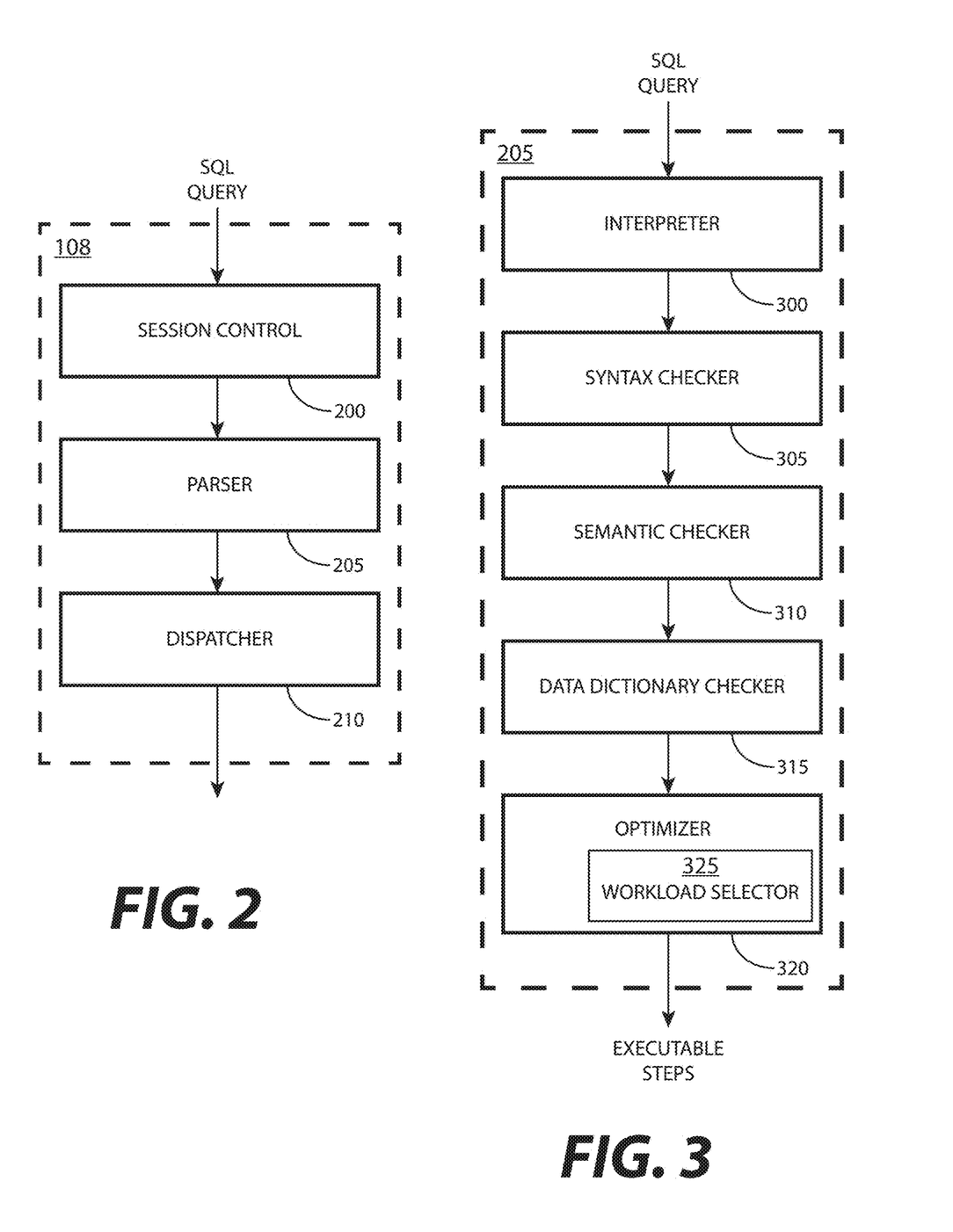
FIG. 2 is one example of a block diagram of a parsing engine.
FIG. 3 is one example of a block diagram of a parser.

Once the session control 200, shown in FIG. 2, allows a session to begin, a user may submit a SQL query. More broadly, the user may submit a "request," a term that includes database queries, which are processed by the DBMS to produce an output result, and other DBMS actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

The SQL query is routed to the parser 205. As illustrated in FIG. 3, the parser 205 interprets the SQL query 300, checks it for proper SQL syntax 305, evaluates it semantically 310, and consults a data dictionary to ensure that all of the objects specified in the SQL query actually exist and that the user has the authority to perform the request 315. Finally, the parser 205 runs an optimizer 320, which develops a query execution plan (QEP) to perform the query and produces executable steps to execute the QEP. The optimizer 320 may include a workload selector 325, an example of which is described below, that may allow the optimizer 320 to interact with a user to present pricing options for executing the query and may allow manual or automatic selection of a QEP to execute the query. A dispatcher 210 issues commands to implement the executable steps.

The optimizer 320 implements a cost model that produces a cost estimate. The cost estimate may be expressed in Vantage Units in the Teradata Vantage System, or in other units in a different type of system. Typically, the cost estimate does not tell the optimizer 320 how to plan but instead provides additional pricing knowledge for a system management system, such as Teradata's Teradata Active Management System (TASM) to meet the demands of a QEP or workload. The details of the cost estimator are in Reference [4].

At SQL processing time, the optimizer 320 will interpret pricing formulas from a Structured Query Language Extended (SQLE) data dictionary, using, for example, cost profiles maintained by a system emulation tool, such as the Teradata System Emulation Tool (TSET).

The optimizer also produces estimated elapsed times, which may be viewed in EXPLAIN outputs and are computed by taking the optimizer's 320 estimated resource usage for each step in a QEP (broken down by various categories such as CPU and I/O) and multiplying them by time cost weight factors. Some optimizers use sophisticated cost models to evaluate and select query execution plans. Such models are designed to estimate major categories of resource usage incurred during query execution and typically include I/O (logical and physical), CPU, network costs, memory, and intermediate result (i.e., spool) sizes.

Because optimizer 320 resource usage estimates are not always accurate when compared to runtime actuals [5], [7], at query execution time the actual runtime metrics are collected and monitored and the estimates may be adjusted. This allows self-tuning/adaptive actions such a query demotion, promotion, aborts and logging to various database query logging systems and other logging systems.

A "workload group" (or alternatively "workload") is a set of requests that have common characteristics, such as an application that issued the requests, a source of the requests, type of query, priority, response time goals, throughput, etc. A workload group is defined by a workload definition (WD), which defines characteristics of the workload group as well as various rules associated with the workload group.

Workload groups may be divided into workload groups of different priorities. A low priority workload group may include low priority requests such as background load requests or reporting requests. Another type of workload group may include requests that have short durations but high priorities. Another type of workload group may include continuous or batch requests, which run for a relatively long time. Yet another type of workload group may be cognizant of the relative cost of the requests, meaning lowest price available is desired, and yet another may only care about getting the request done by a certain date and/or time i.e., deadline management.

An Example Workload Selector

Figure 4:
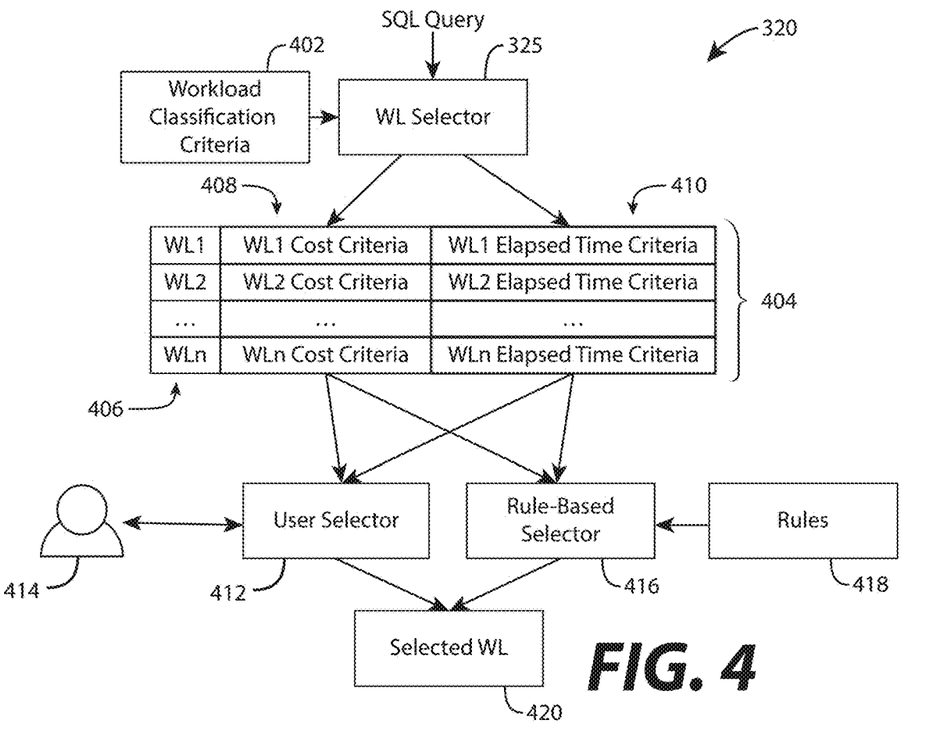
FIG. 4 is one example of a portion of an optimizer including a workload selector.

In one example, illustrated in FIG. 4, which shows a portion of the optimizer 320, including the workload selector 325 (workload is abbreviated "WL" in FIG. 4). The workload selector 325 receives the SQL query (or a different kind of request) and compares it to workload classification criteria 402.

Workload classification criteria are the characteristics that qualify a SQL query to run under the rules of the workload. A large number of criteria can be set to qualify a query to a workload. Conventionally, these criteria include query characteristics criteria (the type of processing it is expected to do), statement type (DDL, DML, Select, COLLECT STATISTICS), limits on the number of processors (e.g., include queries requiring only a single or a few processors), step or final estimated row count, total and step estimated processing time, and join type, etc. The most commonly used of these criteria are estimated total processing time, estimated step processing time, and limits on the number of processors. The techniques described herein add cost criteria and elapsed time criteria as workload classification criteria.

The workload selector 325 produces a list of workloads 404 under which the SQL query is qualified to run. In addition to the criteria described above for matching the SQL query to workloads, the workload selector 325 also matches cost and/or estimated time predicates in the SQL query to cost and elapsed time criteria in the workload classification criteria 402. The selection of workloads 404 may be in the form of a table as shown in FIG. 4 and may include an identifier column identifying the workload 406, a column identifying cost criteria for the workload 408, and a column identifying elapsed time criteria for the workload 410. The identifier column (or columns) 406 may include an identifier, such as "Tactical" or "Cheapest Price." The cost criteria 408 may include one or more cost criterion and the elapsed time criteria 410 may include one or more elapsed time criterion. The table may include additional workload criteria such as those listed above. The selection of workloads may be provided in some form other than a table, such as, for example, a series of drop-down menus or the like.

The optimizer 320 may provide the workload selection table 404 through a user selector interface 412 to a user 414, who will then select the workload under which the SQL query is to be run based on the information provided. Alternatively, the optimizer 320 may provide the workload selection table 404 to a rules-based selector 416 which selects the workload under which the SQL query is to be run based on a set of rules 418. The result is a selected workload 420.

The system 100 then begins execution of the SQL query under the selected workload 420.

Workload Definitions with Cost and/or Deadline Criteria

The technique employed herein facilitates implementation of additional query predicates beyond those conventionally associated with queries. Such additional predicates may include a) a cost threshold or range in which the query must be performed and/or b) a minimum/maximum deadline within which the query must be completed.

Workload definitions are likewise expanded to include cost and deadline criteria under the techniques described herein. Examples of workload definitions (some of which are called "arrival rate meters") against which the workload selector 325 compares the SQL query predicates are listed below.

The examples are for a Teradata Vantage System. Note that each definition includes an "estimated time" criterion and a cost (or, for the Teradata Vantage System, "Vantage Units") criterion.

a. Workload Definition called "Tactical" may be defined as:
  All Users with Account "TacticalQrys" and User not in (MSI, BusObj, Tableau) and QuerybandID="Pay On Demand"
  and Estimated time <100 ms AND <=2 Vantage Units and
  Table Accessed="DailySales";

b. Workload Definition called "Medium Priority" may be defined as:
   All Users with Account "MedPriQrys" and User in (MSI, BusObj, Tableau) and QuerybandID="Off Peak"
   and Estimated time >10000 ms AND >=100 Vantage Units and Table Accessed="PointOfSales" and Deadline of "00:23:00:12-21-2020
c. Workload Definition called "Cheapest Price" can be defined as:
   All Users with Account "LowestPricePossible" and User in (MSI, BusObj, Tableau) and QuerybandID="Spot Pricing"
   and Estimated time >10000 ms AND >=1,000 Vantage Units and Table Accessed="PointOfSales" and Deadline of "00:23:00:12-24-2020"
   A Minimum Deadline is the minimum amount of time a query must be held before it can be considered completed. A Maximum Deadline is the maximum amount of time a query can run before missing its deadline. Such a specification could also be a recurring day-of-week or day-of-month event.
d. Arrival Rate Meter called "Job Scheduling Meter" can be defined as:
   All Users with Account "Job_Schedule_Eligible" and User in (MSI, BusObj, Tableau) and QuerybandID="Super Off Peak" or QuerybandID="Spot Pricing"
   and Estimated time >100000 ms AND >=10,000 Vantage Units and
   Table Accessed="CustomerTbl*" and Deadline of "00:23:00:12-24-2020
e. Arrival Rate Meter called "SLG Sales Reports" can be defined as:
   All Users with Account "SLG_Sales_Reports" and User not in (MSI, BusObj, Tableau) and QuerybandID="Most Important Sales Report"
   and Estimated time <1000 ms AND <=20 Vantage Units and
   Table Accessed="Sales*" and a Deadline of every Monday morning by 9:00 am
f. and so forth;

Exception Processing with Cost and/or Deadline Considerations

The techniques employed herein may add a cost threshold or range and/or a deadline as new threshold attributes of exception criteria.

Exceptions typically are detectable after a query begins execution, such as high skew or too much central processing unit (CPU) utilization. Exceptions consist of criteria and actions to trigger automatically when the criteria are satisfied. Exception criteria typically fall into two categories:
a. Threshold based criteria that trigger as soon as the threshold is exceeded. These can be used to detect such things as maximum spool rows, spool size, blocked time, elapse time, CPU Time, etc.
b. Qualified criteria that trigger after a situation is sustained for a qualification time such as CPU disk ratio and input/output (I/O) or CPU skew or skew percentage. The most commonly used exception criteria are CPU time and elapsed time.

Figure 5:
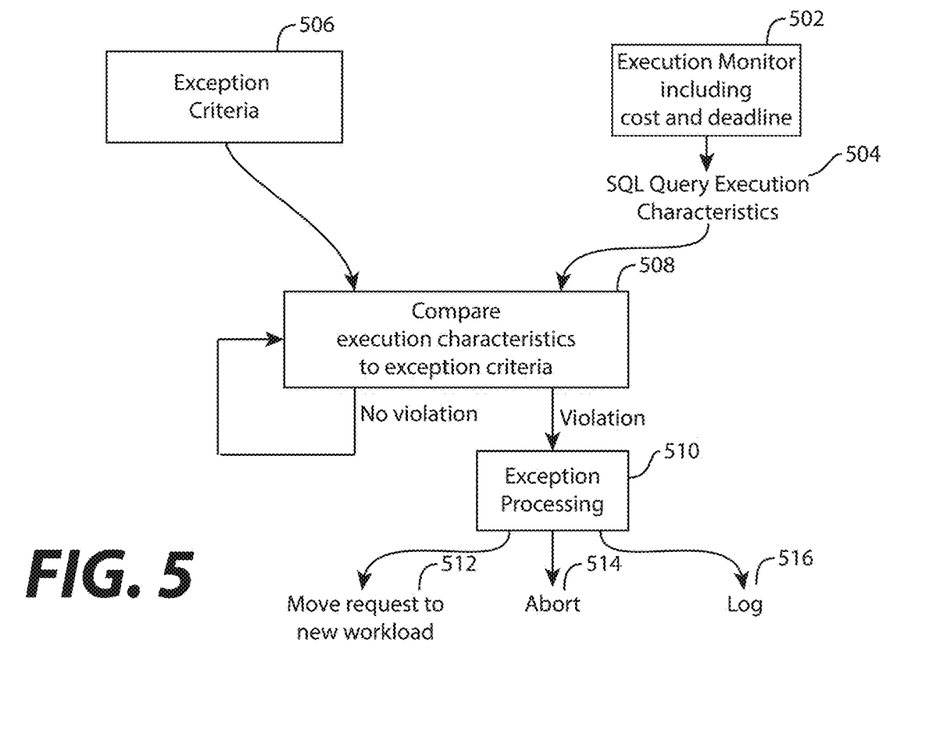
FIG. 5 is an example of exception processing with cost and deadline criteria.

FIG. 5 illustrates exception processing with cost and deadline criteria. Requests currently being executed, such as the SQL query discussed above, are monitored by an execution monitor 502 to produce SQL query execution characteristics 504. In the techniques described herein, the request execution characteristics 504 include the current cost of executing the SQL query (i.e., the cost of query execution to the current time). The SQL query execution characteristics 504 are compared to exception criteria 506 by a comparator 508 to determine if they still meet the criteria of the workload to which the SQL query is currently assigned. In the techniques described herein, the exception criteria 506 are tailored to the workload to which the SQL query is currently assigned, for example through the process described in connection with FIG. 4, and include cost and/or deadline criteria. If the result of the comparison by comparator 508 suggests that a request violates the rules associated with the current workload, an action is taken by an exception monitoring process 510 to move the request to another workload group 512 or to abort it 514, and/or to alert or log the situation with potential follow-up actions as a result of detecting the situation 516. Current response times and throughput of each workload group are also monitored dynamically to determine if they are meeting SLGs. If the comparator 508 detects no violations, processing and exception monitoring continues.

Processing such exception criteria may include detecting an exception that matches an exception criterion and taking an action when the exception is detected. In addition to conventional exception criteria, exception criteria under the techniques described herein may include an exception for deviating from a cost criterion and/or an exception for deviating from a deadline criterion. Detailed examples of such exception criteria in the Teradata Vantage System are listed below, although it will be understood that these are merely examples and that the syntax for describing the exception criteria may be different in systems other than the Teradata Vantage System:

a. If a query running in WD "Low Priority Work" exceeds more than 100,000 Vantage Units or Exceeds a Max Deadline of "00:23:00:12-21-2020" then move the query to a WD called "Lowest Price Possible" which will only execute when the "Spot Pricing" Model" is enabled in the cloud [5].
b. All queries from Account "BO, MSI and Tableau" which exceed a 1,000,000 VUs are considered poorly written code generated queries and moved to WD "Poorly_Written_Queries" where they can only continue running in "Super_Off-Peak" or "Spot_Pricing" Pricing models [5].
c. This query's deadline equals timestamp of 00:17:00:12-24-2020. This is an important query so get it done at any price by deadline.
d. This query's deadline equals a timestamp of 00:17:00:12-24-2020 and I want my query done at the best possible price as advertised in the "What-if" pricing model. This is important to get it done with best possible price by deadline. This is important, I need this report but don't exceed my budget.
e. This query's deadline equals a timestamp of 00:17:00:12-24-2020. However, I want my query done at the cheapest possible price as advertised in the "What-if" pricing estimate model. It is important but I don't want this report to exceed the cheapest possible price. In this example, a Query Band is used to set the Cheapest Possible Price to 2000 VUs. An exception will occur if the query exceeds 2000 VUs.
f. This query's deadline equals a timestamp of 00:17:00:12-24-2020. However, I want my query done at the best possible price as advertised in the "What-if" price estimate model. TASM Exception processing sends an alert and logs the following: "You're getting close to exceeding your budget so you need to reduce your spending from here on out".

g. Same as "d" with a new warning/error message: "It is not possible to achieve cheapest possible price given your requested deadline".

h. Same as "e" with a new warning/error message: "It is not possible to achieve your deadline of Friday given the price you are willing to pay, consider paying more or extending your deadline".

i. Etc.

For this purpose, exception management processing, such as processing by the Teradata Active System Management (TASM) exception processing, may be enhanced to keep a running accumulation of actual Vantage Units (VUs), or equivalents in systems other than the Teradata Vantage System, so as not to exceed capacity budget and deadline limits as defined by an exception processing ruleset definition. Two methods of exceptions may be available, for example in TASM: a) at end of STEP can calculate the running VUs by recalculating the price estimates and deadlines; and b) asynchronously, do the same using Postman/Application Program Interface (PM/API) calls.

State Matrix Processing with Cost and/or Deadline Considerations

The techniques described herein add to a state matrix a cost threshold or range as a new attribute of user defined events and b) "By-WD" events of the state matrix, i.e., "Traffic-cop".

The State Matrix i.e., Traffic Cop, Reference [5], allows different workload management parameters to be associated with different processing states. Moving from one state to another, due to planned or unplanned circumstances, results in an automatic change in the workload management settings. There are three constructs that are used to automate setting changes. These are:

a. Planned Environments—These are the different processing windows, usually time-based, that the system is expected to support such as, night and day, weekday and weekend, month-end, or year-end; for example, operating within the Off Peak planned environment because a load job is executing. There are values that can change based solely on the planned environment. These primarily are the values that indicate priority or percentage of resources that are allocated to workloads such as timeshare level, SLGTier and Virtual Partition relative shares. This allows workloads to be assigned different priorities based on the time of day or day of the week. Adding Vantage Units as an attribute of Planned environments allows specification of pricing as a new type of processing window.

b. Health Conditions—These define the "health states" of the system; for example, Degraded health condition when a node is not functioning, or "down." When a node is down, a more restrictive setup might be desired to be in place.

c. States—These are values that can change based on the combination of the current planned environment and health condition. These changes are defined using a n-dimensional state matrix of health conditions and planned environments as described in Reference [5] (Reference [5] specifically illustrates in FIG. 11 a 2-dimensional state matrix with two dimensions (Operating Environment Event and System Condition) and describes an n-dimensional state matrix allowing for more dimensions than those shown in FIG. 11).

In a majority of customer environments there exists consistent peak workload set of hours (or days), i.e., "time windows" or "windows," where priority management must be more strictly assigned to the highest priority work, with background type work given less than normal resources.

Load, Query or Price Windows exist in which one workload must receive priority to complete within the critical window. For example, consider a query that is required to execute against data that is up to date, including, for example, the previous night's load. In such a circumstance, the previous night's load must be complete before execution of the query is allowed. Another possible consideration is that a query may need more isolated access to the tables to perform to SLGs. Further, price may be more important than performance goals in off-hours of the day.

System or enterprise health degradation can impact a business if critical workloads are not provided with a boost of resources. When this occurs, priority management, filters, throttles, meters and priority techniques can be employed to limit resources to lower importance work so that the critical workloads can be provided the resources they need.

System price performance can also play a role in determining how many nodes to activate, in determining the size of the optimal configuration of a database instance, e.g., a Teradata instance, running in the cloud.

User-defined and "By-WD" event types make system regulation very extensible, with endless opportunities for managing the system. There are many use cases for using User-defined and "By-WD" event types in the cloud or on-prem:

d. User defined event types are generic events whose meanings are defined by the user. These events may be set active/inactive (true/false) via a Workload Management PM/API. As part of this API, the user can define a duration time for which the event should be considered active. If a time is supplied, the event is automatically set inactive/false when the time has expired; otherwise, an explicit API call may be required to change the condition of the event.

e. WD Events or what is commonly referred to as "By-WD" events can be used primarily for monitoring and reporting purposes, to gauge the success of the workload's performance, and to note trends with respect to meeting SLGs.

For example, many businesses have events that impact the way a system should manage its workloads. There are business calendars, where daily, weekly, monthly, quarterly or annual information processing increases or changes the demand put on the system. While period event types provide alignment of a fixed period of time to some of these business events, user-defined events provide the opportunity to de-couple the events from fixed windows of time that often do not align accurately to the actual business event timing. For example, through the use of a period event defined as 6 p.m. until 6 a.m. daily, one could define an event that changes the planned environment to "Loading Off Peak" when the clock ticked 6 p.m. However, if the actual source data required to begin a load is delayed, the actual load may not begin for several hours.

Instead of using a period event, one can define a user-defined event called "Loading-Off-Peak". The load application would activate the event via an PM/API call prior to the load commencing, and de-activate it upon completion. The end result is that workload management is accurately adjusted for the complete duration of the actual load processing, and not shorter or longer than that duration.

In another example, an external application, through the use of Open PM/API commands or other means, can monitor the system for key situations that are useful to act on.

Some example key situations that an external application could monitor are: a persistent miss of a critical WD's SLG (such as a tactical workload or a heartbeat monitoring workload), persistent high or low CPU usage, arrival rate surges, and throttle queue depths associated with a workload. Or the external application could provide even more complex, correlated analysis on the key situations observed to derive more specific knowledge. Once detected through the use of the external application, the event can be conveyed to the RDBMS in the form of a user-defined event with actions, for example, to change the health condition or planned environment and therefore the state of the system.

As an example, consider that a single Teradata Cloud instance may be part of an enterprise of systems that includes multiple Teradata systems cooperating in a dual-active role, various application servers, and source systems. When one of these other systems in the enterprise is degraded or down, it may in turn affect anticipated demand on the Teradata Cloud instance. An external application can convey this information by means of a user-defined event via an PM/API to the Teradata Cloud system. TASM can then act automatically, for example, by changing the health condition and therefore the state, and employ different workload management directives appropriate to the situation. In this particular use case, an "Fold/Unfold", "Hibernate" or "Stop" operation could be issued using IaaS supported APIs to expand the size of the system to meet the SLAs.

The situations tend to be, in essence, an increase or decrease in user demand. The system can respond by using the state matrix directives to disable filters, enable meters on/off, raise throttles of lower priority work in times of anticipated lower user demand, and do the opposite in times of anticipated higher user demand. Generally speaking, these types of investigations can be automatically triggered based on the "By-WD" event enabling a database administrator (DBA) to act automatically to resolve the situation and bring WD performance back to SLG conformance. Adding "Vantage Units" as a new type of By-WD event will allow the DBA to automatically keep the budget within the price conformance of the query, WD and/or system.

Examples of such situations in the Teradata Vantage System may be (similar situations may arise in other types of systems):

a) Don't spend more than 1000,000 VUs on WD "Pay_as_You_Go", change to "Over Budget" Planned environment if this WD exceeds threshold.
b) Change to "Super Off-Peak" Planned environment if System utilization is below a certain threshold. Releasing more queries from the delay queue using the Flex Throttle feature.
c) Calculate the rolling average of the query level VUs by WD aggregate i.e., price charged for the last hour to represent the current state of prices on the system to decide which Planned environment would be Optimal for the system, etc.
d) A WD forecasting report is presented to CIO every Monday morning. The CIO is only willing to pay for 1,000,000 VUs for the calendar week of 12-28-2020. Performance Data Collection and Reporting (PDCR) Capacity Planning reports/models, provided by Teradata Corporation, may be run to determine the optimal number of nodes and queries that can be run for the week. It is determined to limit the "On_Demand" Planned environment to 4 hours a day from 08:00 am-12:00 pm with the rest of the time running split between "Off Peak" and "Super_Off-Peak" Planned Environments.
e) It was discovered that several Account/User IDs are over budget by early Wednesday morning. The offending Account/User IDs are classified to new Arrival Meter which will only run under Spot Pricing Planned Environment at 90% discount rate.
f) The "By-WD" SLG event which monitors WD "TacticalQrys" for SLG compliance triggers a Health condition event changing the system State of the DBS cloud machine to "Critical SLG" State. In this State the system will enable an "unfold" operation of 2 additional nodes, so the "TacticalQrys" WD is in compliance with Monday morning TacticalQry Service Levels (SLGs).
g) CIO allocated a Cloud Instance of 100,000 VUs to the Marketing team for the week of 12-28-2020. The campaign ads exceed 100,000 VUs after the 1st day of running the Ad. A "By WD" event triggers a User Defined Health Condition called VUs exceeded. The instance is put into hibernate i.e., "Suspend mode" until the CIO approves more spending for Marketing team.
h) CIO allocates additional spending for a new Web application analytics team. Since availability requirements can vary with the type of application the lead DBA quickly concludes the Web app team should analyze the Cloud Providers (CPs) spot pricing history, region to bid, instance type required, application requirements, job size, availability desired, fault tolerance of the job, monetary and deadline constraints to minimize the number of out-of-bid failures and to ensure significant cost savings using the spot the instances. The lead DBA concludes a "Bid Mean Price" algorithm [22] is the safest choice for this new Web analytics application. A new User Defined event called "Bid Mean" is written using this algorithm which is only allowed to bid from 12:00 am until 6:00 am Monday thru Friday and 8:00 pm-7:00 am on Weekends. A new State is created in the State Matrix that only the "Bid Mean" UDE is allowed to use.
i) Etc.

As such, billing models can using the techniques described herein be managed by the state matrix using User defined events and/or By WD events to manage the different pricing models. For example, "Pay on Demand" or "Pay as You Go" or "Spot Pricing" or "Vantage Consumption" models, Reference [1], may be managed on a per query and/or Workload Definition (WD) basis. For example, exceeding the maximum cost criterion for the workload that has been selected by a user or a rule-based system to execute a request, as discussed above, may cause the state matrix to change states. For example, the resources devoted to the selected workload may be reduced in an attempt to reduce costs. Similarly, failure of the selected workload to complete the SQL query by the deadline specified in the SQL query predicate may cause the state matrix to change states, for example to increase the resources devoted to processing the selected workload.

Reference [5] describes a system having a single state matrix. The techniques described herein provide for a state matrix, such as that described in Reference [5], to be defined for each workload. As such, one workload's failure to meet cost or deadline goals may cause the state matrix for that workload to change states but may not affect the state matrix for other workloads.

"What-If" Analysis with Cost and/or Deadline Considerations

New attributes provide details of the cost and time requirements of execution of a QEP, using reporting tools such as Teradata's Viewpoint, Visual Explain™ (VE) and PDCR. "What-if" analysis is used to understand pricing in different configuration model scenarios for a QEP.

Figure 6:
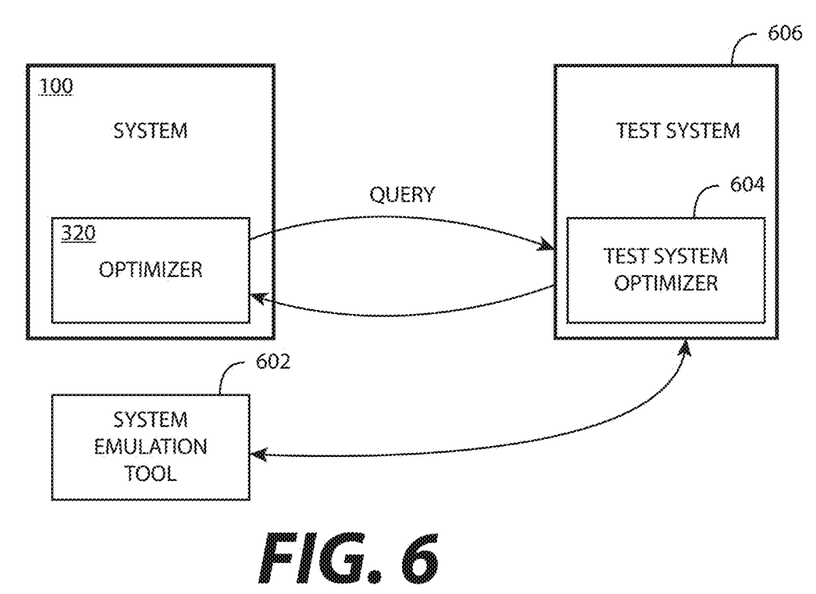
FIG. 6 illustrates an example "what-if" analysis with cost and deadline criteria.

FIG. 6 illustrates "what-if" analysis with cost and deadline criteria. A system emulation tool 602, such as Teradata's System Emulation Tool™ [6] [7], referred to in the Teradata Vantage System as the Teradata System Emulation Tool (TSET) and described in Reference [4], enables users to generate and examine queries and the QEPs generated by a test system optimizer 604 on a test system 606 as if the queries and the QEPs were processed on the target system 100. The system emulation tool 602 allows users to change test system 606 configuration details, determine the source of various problems arising from the queries and the QEPs, and provide an environment that can produce recommendations for a target system workload. In addition, such methods can be used by capacity planning reports found in tools for such purposes, such as the PDCR tool to simulate and estimate the performance impact of potential configuration changes to a given system. When a special "emulation mode" is turned on for the test system 606, the test system optimizer 604 may estimate QEP costs as if it were operating on the target system (real or hypothetical) 100.

An EXPLAIN modifier inserted into a query may cause the test system optimizer 604 to generate a summary of the QEP for the DBMS 102 to perform the query. The summary typically includes one or more cost estimates for the DBMS 102 to perform the query. Analyzing the EXPLAIN output with pricing can be difficult, but there are tools to help, such as Visual Explain™ (VE), provided by Teradata Corporation and described in Reference [4]. Such tools visually depict the EXPLAIN output with pricing, i.e., the summary of the QEP for the query, cost estimates and the price estimate, in a graphical manner, wherein the EXPLAIN output with pricing is broken down into discrete steps showing the flow of data during execution. Moreover, such tools provide the ability to compare multiple versions of the EXPLAIN output with pricing side-by-side.

In other words, configuration models can be managed by such tools to manage the different "What-if" pricing estimates. For example, "Pay on Demand" or "Pay as You Go" or "Spot Pricing" reports and/or recommendations can be generated for each emulated system and/or State.

The subsequent price estimates for any queries submitted to the test system represent "what-if" estimates for the target system.

The tools allow different optimizer cost profiles and workload management parameters to be associated with different processing states. Moving from one state to another, due to planned or unplanned circumstances, results in different "What-if" scenarios and reporting using the different workload management settings.

For example, User A can quickly activate a database instance, for example a small Teradata database, in the cloud and issue the following SQL command: "Diagnostic set costs on for System" where 'System' could be any size model configuration/vantage Units: a) 1 node=1,000,000 VU's; b) 2 nodes=2,000,000 VU's; c) 3 nodes=3,000,000 VU's d), etc.

Figure 7:
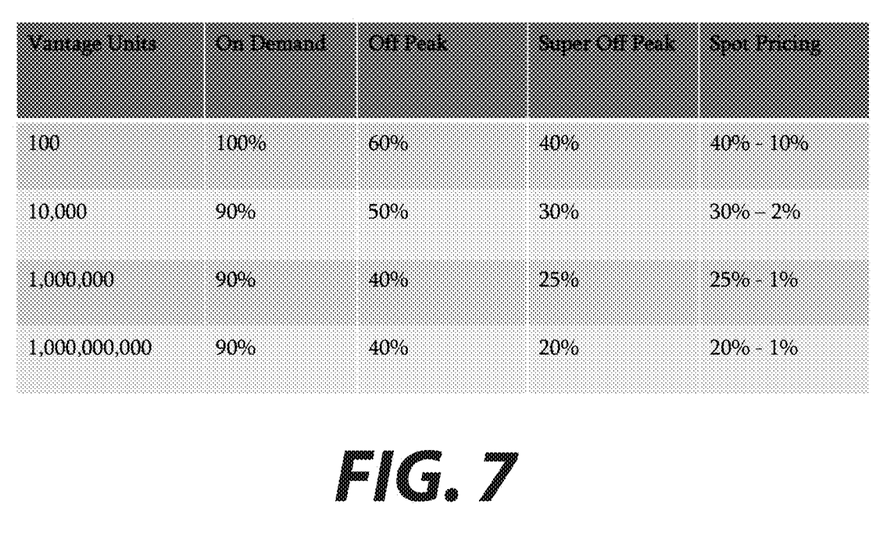
FIG. 7 illustrates a tier-based discount pricing example.

Continuing with the example, USER A can display a QEP using the EXPLAIN modifier or the tools described above in which User A can visually see the pricing estimates, e.g., in the case of a Teradata system, Vantage Units, on a Step-by-Step basis. The tools may also show User A a cross-comparison of prices estimates with discounted rate pricing, as illustrated in FIG. 7 for an example Teradata system. In FIG. 7, which illustrates a tier-based discount pricing example, the first column lists a cost in Vantage Units and the other columns represent respective pricing models. The cells at the intersection of each row and column represent the relative amount that a user would pay for that option. For example, a user would be willing to pay 100 percent for a On Demand billing model at 100 Vantage Units but only 20 percent for a Super Off Peak billing model at 1,000,000,000 Vantage Units.

In another example, User A can run the query in a WD called "Lowest Price Possible." In this case, the actual run-time prices can be calculated in one of the tools, such as Teradata's PDCR or Viewpoint pricing reports, e.g., Query Spotlight Portlet using DBQL or ResSUsageSPS data. The reports can reflect the discounted price i.e., actual cost since the DBQL/ResUsage logs the WDID, Vantage Units, Planned environment and State of the system.

In yet another example, User A wants to see if query can meet deadline and how much a query will cost given a default system configuration in the cloud (i.e., using a Teradata example: 1 node, 1 parsing engine and 2 processors) for different pricing models such as: a) Pay_on_Demand; b) Off_Peak; c) Super Off-Peak; d) Spot Pricing; e) etc. User A, upon receiving the workload analysis 404 (see FIG. 4), sees they can afford the Off Peak prices but sees the query will not be met by the estimated deadline; User A chooses a more powerful configuration (2 nodes, 2 parsing engines, and 8 processors) using the system emulation tool 602 and the test system 606. User A sees they can afford the more powerful configuration if they run the query during "Super Off-peak" time periods. In all "What-if" cases, the actual run-time prices can be calculated using various query logging and analysis tools, such as Teradata's PDCR and/or Viewpoint pricing reports e.g., Query Spotlight Portlet using DBQL and/or ResSUsageSPS data. The reports can reflect the discounted price i.e., actual cost and deadline since the DBQL/ResUsage logs the WDID, Vantage Units, discounted prices, Planned environment and State of the system.

Further examples consistent with the present teaching are set out in the following numbered clauses.

Clause 1. A computer-implemented method, comprising:
executing a database management system (DBMS) in a computer system, wherein the DBMS manages a database comprised of DBMS resources;
the DBMS receiving a request to be executed, wherein the request is a DBMS action to be executed using the DBMS resources and wherein the request includes a predicate specifying a maximum cost for executing the request, and a deadline, specifying a deadline by which the request is to be completed in its execution;
the DBMS determining a plurality of workloads under which the request is qualified to execute, wherein each workload of the plurality of workloads comprises a respective set of requests that have common characteristics, and wherein each workload of the plurality of workloads includes a respective cost criterion and a respective elapsed time criterion;
the DBMS selecting a selected workload from among the plurality of workloads, the selected workload having a selected cost criterion and a selected elapsed time criterion; and
the DBMS beginning execution of the request using the selected workload.

Clause 2. The computer-implemented method of clause 1 wherein the computer system includes multiple computer systems, including a cloud-based computer system.

Clause 3. The computer-implemented method of any of clauses 1-2 wherein the costs are expressed as a measurement of system resources, such as processors, memory, input/output (I/O), network bandwidth, etc., consumed by an individual request.

Clause 4. The computer-implemented method of any of clauses 1-3 wherein the DBMS selecting the selected workload comprises:
- the DBMS providing the cost criterion and elapsed time criterion for each of the plurality of workloads to a user; and
- the user selecting the selected workload from among the plurality of workloads.

Clause 5. The computer-implemented method of any of clauses 1-4 wherein the DBMS selecting the selected workload comprises the DBMS applying selection rules to the plurality of workloads.

Clause 6. The computer-implemented method of any of clauses 1-5 wherein:
- the DBMS tracks accumulated costs of execution of the request and determines that the accumulated costs will exceed the maximum cost included in the request predicate or determines that execution of the request will not satisfy the deadline included in the request predicate; and
- the DBMS declares an exception.

Clause 7. The computer-implemented method of any of clauses 1-6 further comprising:
- the DBMS, in managing workloads, monitoring system conditions and operating environment events that impact on the operation of the computer system, wherein each of the system conditions represents a condition of the computer system and each of the operating environment events represents a workload performed by the computer system;
- the DBMS using an n-dimensional state matrix to identify at least one state resulting from the monitored system conditions and operating environment events, wherein each element of the state matrix is a system condition and operating environment event pair that references a workload management state;
- the DBMS initiating an action in response to the identified state, wherein the action invokes one or more workload management rules of a set of workload management rules that define how the computer system operates on the workloads;
- the DBMS changing the state in the n-dimensional state matrix when the selected workload exceeds the selected cost criterion.

Clause 8. The computer-implemented method of any of clauses 1-7 wherein:
- the DBMS, prior to determining the plurality of workloads under which the request is qualified to execute, runs a simulation of the computer system on a test system, wherein the computer system has a current configuration; and
- the test system determining a cost of running the request assuming the request is run on the computer system with a configuration different from the current configuration.

Clause 9. The computer-implemented method of any of clauses 1-8 wherein:
- the DBMS, prior to determining the plurality of workloads under which the request is qualified to execute, runs a simulation of the computer system on a test system; and
- the test system determining a cost of running the request under a plurality of workloads.

Clause 10. A non-transitory computer-readable tangible medium, on which is recorded a computer program, the computer program comprising executable instructions, that, when executed, perform a method comprising:
- executing a database management system (DBMS) in a computer system, wherein the DBMS manages a database comprised of DBMS resources;
- the DBMS receiving a request to be executed, wherein the request is a DBMS action to be executed using the DBMS resources and wherein the request includes a predicate specifying a maximum cost for executing the request, and a deadline, specifying a deadline by which the request is to be completed in its execution;
- the DBMS determining a plurality of workloads under which the request is qualified to execute, wherein each workload of the plurality of workloads comprises a respective set of requests that have common characteristics, and wherein each workload of the plurality of workloads includes a respective cost criterion and a respective elapsed time criterion;
- the DBMS selecting a selected workload from among the plurality of workloads, the selected workload having a selected cost criterion and a selected elapsed time criterion; and
- the DBMS beginning execution of the request using the selected workload.

Clause 11. The method of clause 10 wherein the computer system includes multiple computer systems, including a cloud-based computer system.

Clause 12. The method of any of clauses 10-11 wherein the costs are expressed as a measurement of system resources, such as processors, memory, input/output (I/O), network bandwidth, etc., consumed by an individual request.

Clause 13. The method of any of clauses 10-12 wherein the DBMS selecting the selected workload comprises:
- the DBMS providing the cost criterion and elapsed time criterion for each of the plurality of workloads to a user; and
- the user selecting the selected workload from among the plurality of workloads.

Clause 14. The method of any of clauses 10-13 wherein the DBMS selecting the selected workload comprises the DBMS applying selection rules to the plurality of workloads.

Clause 15. The method of any of clauses 10-14 wherein:
- the DBMS tracks accumulated costs of execution of the request and determines that the accumulated costs will exceed the maximum cost included in the request predicate or determines that execution of the request will not satisfy the deadline included in the request predicate; and
- the DBMS declares an exception.

Clause 16. The method of any of clauses 10-15 further comprising:
- the DBMS, in managing workloads, monitoring system conditions and operating environment events that impact on the operation of the computer system, wherein each of the system conditions represents a condition of the computer system and each of the operating environment events represents a workload performed by the computer system;

the DBMS using an n-dimensional state matrix to identify at least one state resulting from the monitored system conditions and operating environment events, wherein each element of the state matrix is a system condition and operating environment event pair that references a workload management state;

the DBMS initiating an action in response to the identified state, wherein the action invokes one or more workload management rules of a set of workload management rules that define how the computer system operates on the workloads;

the DBMS changing the state in the n-dimensional state matrix when the selected workload exceeds the selected cost criterion.

Clause 17. The method of any of clauses 10-16 wherein:

the DBMS, prior to determining the plurality of workloads under which the request is qualified to execute, runs a simulation of the computer system on a test system, wherein the computer system has a current configuration; and the test system determining a cost of running the request assuming the request is run on the computer system with a configuration different from the current configuration.

Clause 18. The method of any of clauses 10-17 wherein:

the DBMS, prior to determining the plurality of workloads under which the request is qualified to execute, runs a simulation of the computer system on a test system; and the test system determining a cost of running the request under a plurality of workloads.

Clause 19. An apparatus comprising:

a computer system executing a database management system (DBMS);

the DBMS managing a database comprised of DBMS resources;

the DBMS receiving a request to be executed, wherein the request is a DBMS action to be executed using the DBMS resources and wherein the request includes a predicate specifying a maximum cost for executing the request, and a deadline, specifying a deadline by which the request is to be completed in its execution;

the DBMS determining a plurality of workloads under which the request is qualified to execute, wherein each workload of the plurality of workloads comprises a respective set of requests that have common characteristics, and wherein each workload of the plurality of workloads includes a respective cost criterion and a respective elapsed time criterion;

the DBMS selecting a selected workload from among the plurality of workloads, the selected workload having a selected cost criterion and a selected elapsed time criterion; and the DBMS beginning execution of the request using the selected workload.

Clause 20. The apparatus of clause 19 wherein the computer system includes multiple computer systems, including a cloud-based computer system.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Article entitled "Consumption Pricing for Teradata Vantage". https://www.teradata.com/Cloud/Consumption-Pricing

[2] Teradata Vantage™ SQL Request and Transaction Processing. Release 16.20, March 2019. DOCS.TERADATA.COM

[3] Teradata Vantage Advanced SQL Engine. https://www.teradata.com/Products/Software/Database

[4] U.S. Provisional Patent Application No. 63/043,703, filed on Jun. 24, 2020, by Frank Roderic Vandervort, Louis Martin Burger, and Douglas P. Brown, entitled "ESTIMATING AAS QUERY PRICES WITHIN OPTIMIZER EXPLAINED PLANS;" and U.S. patent application Ser. No. 17/124,210, filed Dec. 16, 2020, by Frank Roderic Vandervort, Louis Martin Burger, and Douglas P. Brown, entitled "ESTIMATING AS-A-SERVICE QUERY PRICES WITHIN OPTIMIZER EXPLAINED PLANS," (claiming the benefit of U.S. Provisional Patent Application No. 63/043,703).

[5] U.S. Pat. No. 8,042,119, Anita Richards et al., entitled "States matrix for workload management simplification," issued Oct. 18, 2011; and U.S. Pat. No. 9,875,146, Douglas P. Brown, et al., entitled "Managing workloads using a plurality of health and demand metrics," issued Jan. 23, 2018.

[6] U.S. Pat. No. 8,818,988, Douglas P. Brown et al., entitled "Database system having a regulator to provide feedback statistics to an optimizer," issued Aug. 26, 2014.

[7] U.S. Pat. No. 7,127,456, Douglas P. Brown, et al., entitled "System and method for logging database queries," issued Oct. 24, 2006.

[8] Viktor Leis et al. How good are query optimizers, really? Proc. VLDB Endow., 2015.

[9] U.S. Pat. No. 10,261,888, Douglas P. Brown, et al., entitled "Emulating an environment of a target database system," issued Apr. 16, 2019.

[10] Teradata System Emulation Tool User Guide. Release 16.20, October 2018. DOCS.TERADATA.COM

[11] Google BigQuery User Documentation. https://cloud.google.com/bigquery/docs/best-practices-costs

[12] Google Cloud article entitled "Compute Engine" (includes a section on "Compute Engine pricing"). https://cloud.google.com/compute/.

[13] Article entitled "Amazon EC2 Reserved Instances". https://aws.amazon.com/ec2/purchasing-options/reserved-instances/.

[14] Article entitled "Amazon EC2Spot Instances". https://aws.amazon.com/ec2/spot/.

[15] F. R. Dogar, T. Karagiannis, H. Ballani, and A. Rowstron, "Decentralized task-aware scheduling for data center networks," in *Proc. of ACM SIGCOMM,* 2014.

[16] Z. Huang, S. M. Weinberg, L. Zheng, C. Joe-Wong, and M. Chiang, "Discovering valuations and enforcing truthfulness in a deadline-aware scheduler," in *Proc. of IEEE INFOCOM*, 2017.

[17] X. Meng, V. Pappas, and L. Zhang, "Improving the scalability of data center networks with traffic-aware virtual machine placement," in *Proc. of IEEE INFOCOM*, 2010.

[18] J. Xu and J. A. Fortes, "Multi-objective virtual machine placement in virtualized data center environments," in *Proc. of IEEE/ACM GREENCOM-CPSCOM*, 2010.

[19] Google Cloud article entitled "Preemptible Virtual Machines". https.//cloud.google.com/preemptible-vms/.

[20] O. Agmon Ben-Yehuda, M. Ben-Yehuda, A. Schuster, and D. Tsafrir, "Deconstructing Amazon EC2 spot instance pricing," *ACM Trans. on Economics and Computation*, vol. 1, no. 3, 2013.

[21] L. Zheng, C. Joe-Wong, C. W. Tan, M. Chiang, and X. Wang, "How to bid the cloud," in *Proc. of ACM SIGCOMM*, 2015.

[22] Bidding Strategies for Amazon EC2 Spot Instances—A Comprehensive Review, April 2019-DOI: 10.1109/ICCUBEA.2018.8697462. Conference: 2018 Fourth International Conference on Computing Communication Control and Automation (ICCUBEA).

What is claimed is:

1. A computer-implemented method, comprising:
    executing a database management system (DBMS) in a computer system, wherein the DBMS manages a database comprised of DBMS resources;
    the DBMS receiving a request to be executed, wherein the request is a DBMS action to be executed using the DBMS resources and wherein the request includes a predicate specifying a maximum cost for executing the request, and a deadline, specifying a deadline by which the request is to be completed in its execution;
    the DBMS determining a plurality of workloads under which the request is qualified to execute, wherein each workload of the plurality of workloads comprises a respective set of requests that have common characteristics, and wherein each workload of the plurality of workloads includes a respective cost criterion and a respective elapsed time criterion;
    the DBMS selecting a selected workload from among the plurality of workloads, the selected workload having a selected cost criterion and a selected elapsed time criterion; and
    the DBMS beginning execution of the request using the selected workload;
    wherein:
    the DBMS tracks accumulated costs of execution of the request and determines that the accumulated costs will exceed the maximum cost included in the request predicate or determines that execution of the request will not satisfy the deadline included in the request predicate; and
    the DBMS declares an exception.

2. The computer-implemented method of claim 1 wherein the computer system includes multiple computer systems, including a cloud-based computer system.

3. The computer-implemented method of claim 1 wherein the costs are expressed as a measurement of system resources, including one or more of processors, memory, input/output (I/O), network bandwidth, etc., consumed by an individual request.

4. The computer-implemented method of claim 1 wherein the DBMS selecting the selected workload comprises:
    the DBMS providing the cost criterion and elapsed time criterion for each of the plurality of workloads to a user; and
    the user selecting the selected workload from among the plurality of workloads.

5. The computer-implemented method of claim 1 wherein the DBMS selecting the selected workload comprises the DBMS applying selection rules to the plurality of workloads.

6. The computer-implemented method of claim 1 further comprising:
    the DBMS, in managing workloads, monitoring system conditions and operating environment events that impact on the operation of the computer system, wherein each of the system conditions represents a condition of the computer system and each of the operating environment events represents a workload performed by the computer system;
    the DBMS using an n-dimensional state matrix to identify at least one state resulting from the monitored system conditions and operating environment events, wherein each element of the state matrix is a system condition and operating environment event pair that references a workload management state;
    the DBMS initiating an action in response to the identified state, wherein the action invokes one or more workload management rules of a set of workload management rules that define how the computer system operates on the workloads;
    the DBMS changing the state in the n-dimensional state matrix when the selected workload exceeds the selected cost criterion.

7. The computer-implemented method of claim 1 wherein:
    the DBMS, prior to determining the plurality of workloads under which the request is qualified to execute, runs a simulation of the computer system on a test system, wherein the computer system has a current configuration; and
    the test system determining a cost of running the request assuming the request is run on the computer system with a configuration different from the current configuration.

8. The computer-implemented method of claim 1 wherein:
    the DBMS, prior to determining the plurality of workloads under which the request is qualified to execute, runs a simulation of the computer system on a test system; and
    the test system determining a cost of running the request under a plurality of workloads.

9. A non-transitory computer-readable tangible medium, on which is recorded a computer program, the computer program comprising executable instructions, that, when executed, perform a method comprising:
    executing a database management system (DBMS) in a computer system, wherein the DBMS manages a database comprised of DBMS resources;
    the DBMS receiving a request to be executed, wherein the request is a DBMS action to be executed using the DBMS resources and wherein the request includes a predicate specifying a maximum cost for executing the request, and a deadline, specifying a deadline by which the request is to be completed in its execution;
    the DBMS determining a plurality of workloads under which the request is qualified to execute, wherein each workload of the plurality of workloads comprises a respective set of requests that have common characteristics, and wherein each workload of the plurality of workloads includes a respective cost criterion and a respective elapsed time criterion;

the DBMS selecting a selected workload from among the plurality of workloads, the selected workload having a selected cost criterion and a selected elapsed time criterion; and the DBMS beginning execution of the request using the selected workload;

the DBMS, in managing workloads, monitoring system conditions and operating environment events that impact on the operation of the computer system, wherein each of the system conditions represents a condition of the computer system and each of the operating environment events represents a workload performed by the computer system;

the DBMS using an n-dimensional state matrix to identify at least one state resulting from the monitored system conditions and operating environment events, wherein each element of the state matrix is a system condition and operating environment event pair that references a workload management state;

the DBMS initiating an action in response to the identified state, wherein the action invokes one or more workload management rules of a set of workload management rules that define how the computer system operates on the workloads; and the DBMS changing the state in the n-dimensional state matrix when the selected workload exceeds the selected cost criterion.

10. The method of claim 9, wherein the computer system includes multiple computer systems, including a cloud-based computer system.

11. The method of claim 9 wherein the costs are expressed as a measurement of system resources, including one or more of processors, memory, input/output (I/O), network bandwidth, etc., consumed by an individual request.

12. The method of claim 9, wherein the DBMS selecting the selected workload comprises:
the DBMS providing the cost criterion and elapsed time criterion for each of the plurality of workloads to a user; and
the user selecting the selected workload from among the plurality of workloads.

13. The method of claim 9 wherein the DBMS selecting the selected workload comprises the DBMS applying selection rules to the plurality of workloads.

14. The method of claim 9 wherein:
the DBMS tracks accumulated costs of execution of the request and determines that the accumulated costs will exceed the maximum cost included in the request predicate or determines that execution of the request will not satisfy the deadline included in the request predicate; and
the DBMS declares an exception.

15. The method of claim 9, wherein:
the DBMS, prior to determining the plurality of workloads under which the request is qualified to execute, runs a simulation of the computer system on a test system, wherein the computer system has a current configuration; and
the test system determining a cost of running the request assuming the request is run on the computer system with a configuration different from the current configuration.

16. The method of claim 9 wherein:
the DBMS, prior to determining the plurality of workloads under which the request is qualified to execute, runs a simulation of the computer system on a test system; and
the test system determining a cost of running the request under a plurality of workloads.

17. An apparatus comprising:
a computer system executing a database management system (DBMS);
the DBMS managing a database comprised of DBMS resources;
the DBMS receiving a request to be executed, wherein the request is a DBMS action to be executed using the DBMS resources and wherein the request includes a predicate specifying a maximum cost for executing the request, and a deadline, specifying a deadline by which the request is to be completed in its execution;
the DBMS determining a plurality of workloads under which the request is qualified to execute, wherein each workload of the plurality of workloads comprises a respective set of requests that have common characteristics, and wherein each workload of the plurality of workloads includes a respective cost criterion and a respective elapsed time criterion;
the DBMS selecting a selected workload from among the plurality of workloads, the selected workload having a selected cost criterion and a selected elapsed time criterion; and
the DBMS beginning execution of the request using the selected workload;
wherein:
the DBMS tracks accumulated costs of execution of the request and determines that the accumulated costs will exceed the maximum cost included in the request predicate or determines that execution of the request will not satisfy the deadline included in the request predicate; and
the DBMS declares an exception.

18. The apparatus of claim 17 wherein the computer system includes multiple computer systems, including a cloud-based computer system.

* * * * *